(12) United States Patent
Song

(10) Patent No.: US 10,394,062 B1
(45) Date of Patent: Aug. 27, 2019

(54) FOLDABLE DISPLAY DEVICE

(71) Applicant: PREXCO CO., LTD, Chungcheongnam-do (KR)

(72) Inventor: In-Sung Song, Incheon (KR)

(73) Assignee: Prexco Co., LTD., Chungcheongnam-Do (KR)

( * ) Notice: Subject to any disclaimer, the term of this patent is extended or adjusted under 35 U.S.C. 154(b) by 0 days.

(21) Appl. No.: 16/111,523

(22) Filed: Aug. 24, 2018

(30) Foreign Application Priority Data

May 28, 2018 (KR) .................. 10-2018-0060261

(51) Int. Cl.
G02F 1/1333 (2006.01)
E05D 11/10 (2006.01)
E05D 3/12 (2006.01)
E05D 11/00 (2006.01)

(52) U.S. Cl.
CPC .. G02F 1/133305 (2013.01); G02F 1/133308 (2013.01); *E05D 3/122* (2013.01); *E05D 11/0054* (2013.01); *E05D 11/1064* (2013.01); *E05Y 2900/606* (2013.01); *G02F 2001/133328* (2013.01); *G02F 2201/46* (2013.01)

(58) Field of Classification Search
CPC combination set(s) only.
See application file for complete search history.

(56) References Cited

U.S. PATENT DOCUMENTS

| | | | |
|---|---|---|---|
| 7,565,720 B1* | 7/2009 | Ligtenberg | G06F 1/1616 16/366 |
| 9,557,771 B2* | 1/2017 | Park | G06F 1/1641 |
| 9,848,502 B1* | 12/2017 | Chu | F16C 11/04 |
| 2012/0044620 A1* | 2/2012 | Song | G06F 1/1616 361/679.01 |
| 2016/0295709 A1* | 10/2016 | Ahn | H05K 5/0017 |

FOREIGN PATENT DOCUMENTS

| KR | 10-0909713 | 7/2009 |
|---|---|---|
| KR | 10-2012-0129234 | 11/2012 |

* cited by examiner

*Primary Examiner* — James Wu
*Assistant Examiner* — Hung Q Dang
(74) *Attorney, Agent, or Firm* — Fay Sharpe LLP

(57) ABSTRACT

Disclosed is a foldable display device. According to an embodiment of the present invention, the foldable display device includes a first body and a second body that are formed in the same shape as a plate and are arranged symmetrically with each other, and a hinge device assembled to connect the first body and the second body to each other, such that the hinge device rotates within an opened state range where the first and second bodies are placed on the same plane and within a closed state range where the first and second bodies overlap each other.

4 Claims, 15 Drawing Sheets

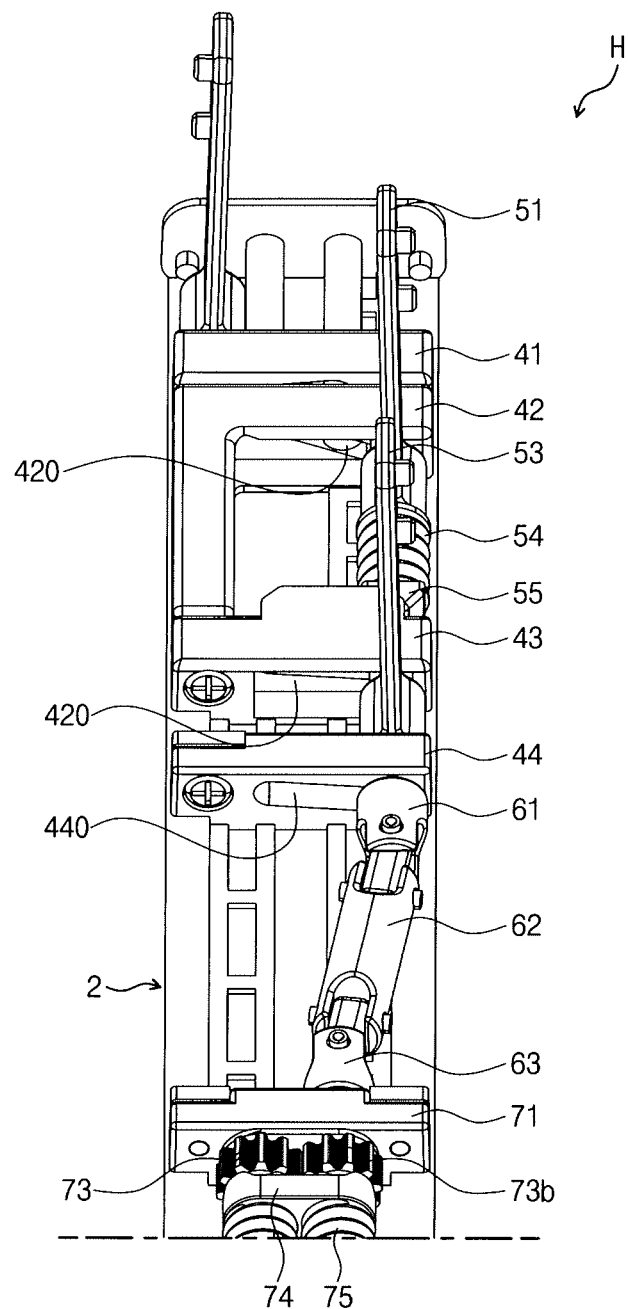
[Fig. 15]

FOLDABLE DISPLAY DEVICE

CROSS REFERENCE TO RELATED APPLICATION

The present application claims priority to Korean Patent Application No. 10-2018-0060261, filed May 28, 2018, the entire contents of which is incorporated herein for all purposes by this reference.

BACKGROUND OF THE INVENTION

Field of the Invention

The present invention relates generally to a foldable display device. More particularly, the present invention relates to a foldable display device, wherein a first body and a second body of an electronic device having a foldable display part are rotatably connected to each other, and a rotation angle between the first and second bodies is efficiently set.

Description of the Related Art

Unless otherwise indicated in this specification, the descriptions set forth herein are not meant to be related art to the claims of this application, and are not to be admitted as related art.

Due to increasing industrial demand for portable electronic devices including portable terminals, portable electronic devices having various forms and functions meeting customer needs are being introduced.

General portable terminals, such as mobile phones, have a display part for displaying images, pictures, etc., and portable terminals having a function of watching TV through the display part or visually obtaining various information over a wired or wireless Internet have appeared.

Furthermore, the portable terminals have been developed in various forms tailored to consumer demand and functional characteristics, and have been developed variously as a foldable type, a slidable type, a bar type, etc.

Herein, a foldable type portable terminal denotes a terminal in which two bodies are hinged together and opened in order to expand a usable area, and has continuously been developed due to its superior structural characteristics.

Particularly, in recent years, development of a thin film transistor-liquid crystal display technology and weight reduction of other components have become possible, and generally, most portable terminals have become slimmer, and their demand is increasing day by day.

However, because the external profile of portable terminals in the related art has been developed on the basis of forms more suitable for performing communication functions such as voice call, message transmission, etc., there is a disadvantage in that it may be inconvenient to use a multimedia service. For example, the display part of a general portable terminal has a vertically long shape and thus is inconvenient for viewing digital multimedia broadcasts, video files, etc.

In an effort to solve such a problem, Korean Patent No. 10-0909713 disclosed "Hinge device for mobile phone" as a registered patent of the present applicant. In order to solve the above-mentioned problem, the exemplary embodiment of the this invention disclosed a hinge device for a mobile phone which is configured such that a cover of the mobile phone is rotatable by an open angle and a 360 degree angle with respect to a vertical direction while ultimately achieving structural stability of the entire device.

According to Korean Patent No. 10-0909713, there is a great advantage in that convenience of use can be enhanced and consumer demand to utilize the display part of the mobile phone in a relatively wide range can be satisfied. However, there is room for improvement, and it is necessary to develop a new type of hinge device and an electronic device using the same.

For example, in order to satisfy consumer demand for a large display screen even in the case of a small-size electronic device, it is necessary to provide an electronic device of a type in which a liquid crystal screen is provided on both of two bodies that are hingedly rotated together, and two individual liquid crystal screens are combined to form a single large screen when the electronic device is opened from a closed state. In addition, it is necessary to develop a hinge device of a type suitable for the same.

Documents of Related Art

Patent Document (Patent document 1) Korean Patent Application No. 10-2011-0047360

SUMMARY OF THE INVENTION

Accordingly, the present invention has been made keeping in mind the above problem occurring in the related art, and the present invention provides a foldable display device, wherein an inclination angle of a hinge device is freely adjusted so as to form an acute angle or obtuse angle of operation of the hinge device in addition to open and close operations and the adjusted angle is temporarily maintained, leading to an improvement in user convenience.

In order to achieve the above object, according to one aspect of the present invention, there is provided a foldable device including: a first body and a second body that are formed in the same shape as a plate and are arranged symmetrically with each other; and a hinge device assembled to connect the first body and the second body to each other, such that the hinge device rotates within an open state range where the first and second bodies are placed on the same plane and within a close state range where the first and second bodies overlap each other, wherein the first body or the second body includes: a hinge cover rotatably connected to the hinge device and having a key protruding from opposite sides thereof; an outer cover coupled to the hinge device and having a sliding groove formed on opposite sides thereof, the sliding groove providing a section where the key of the hinge cover is inserted and moved; and a support plate coupled to the outer cover in an overlapping manner and having the image portion attached thereto.

According to the disclosed embodiment, it is possible to freely adjust an inclination angle of the hinge device so as to form an acute angle or obtuse angle of operation of the hinge device in addition to open and close operations and it is possible to temporarily maintain the adjusted angle, thereby leading to an improvement in user convenience.

BRIEF DESCRIPTION OF THE DRAWINGS

The above and other objects, features and other advantages of the present invention will be more clearly understood from the following detailed description when taken in conjunction with the accompanying drawings, in which:

FIG. 15 is a partially enlarged perspective view of FIG. 13.

DETAILED DESCRIPTION OF THE INVENTION

Hereinbelow, exemplary embodiments of the present invention will be described in detail with reference to the accompanying drawings.

It should be understood that the following embodiments are presented to make complete disclosure of the present invention and help those who are ordinarily skilled in the art best understand the invention. Various changes to the following embodiments are possible and the scope of the present invention is not limited to the following embodiments.

Also, for convenience of understanding of the elements, in the figures, sizes or thicknesses may be exaggerated to be large (or thick), may be expressed to be small (or thin) or may be simplified for clarity of illustration, and technical terms defined in consideration of their function in the present invention may be varied according to the intention of a user, practice, or the like, so that the terms should be defined based on the contents of this specification.

Figure 1:
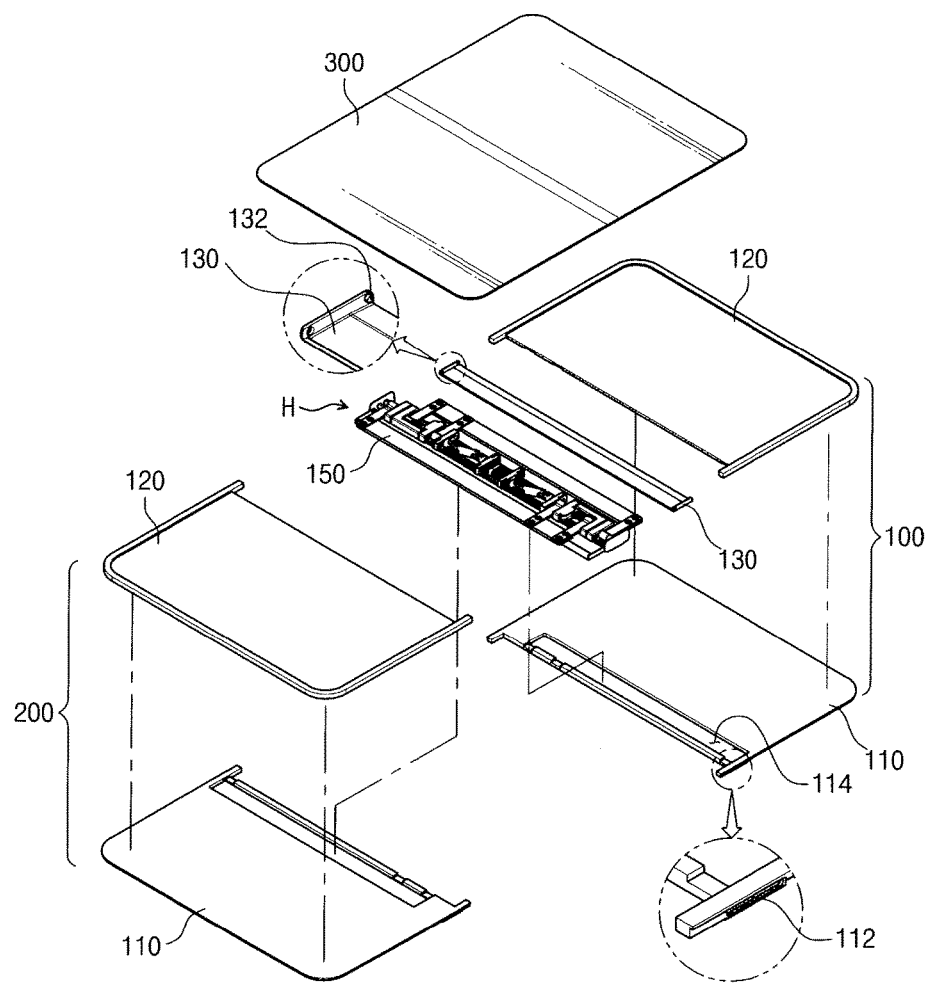
FIG. 1 is an exploded perspective view showing a foldable display device in an opened state according to an embodiment.
Figure 2:
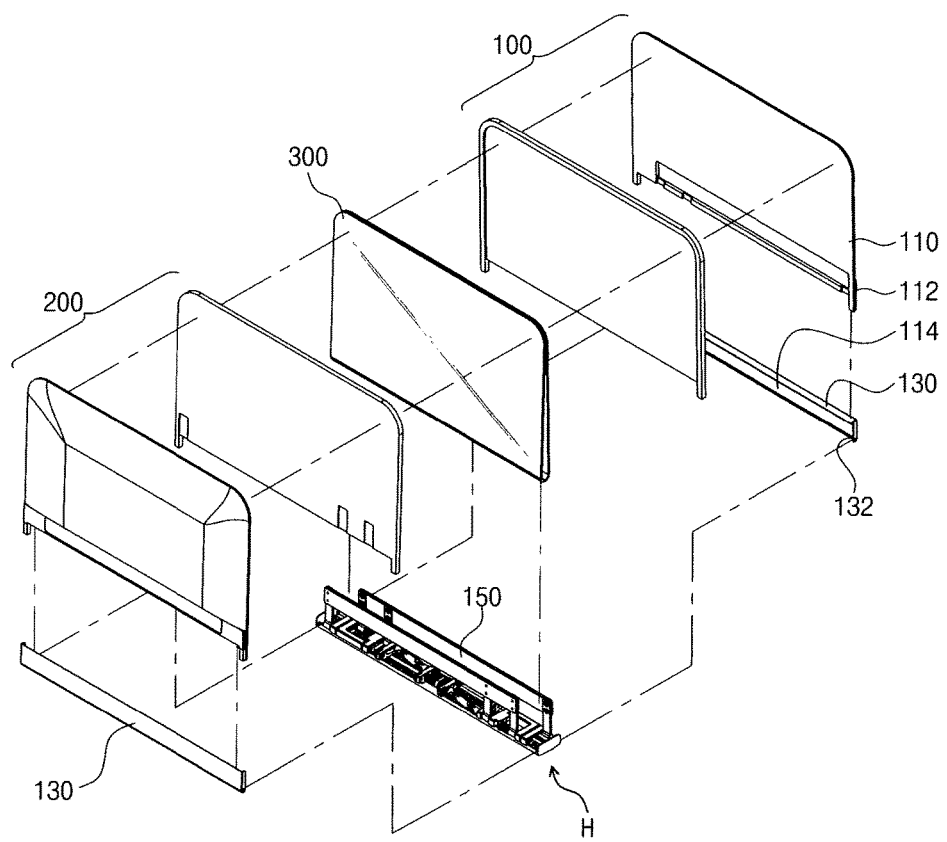
FIG. 2 is an exploded perspective view showing the foldable display device in a closed state according to the embodiment.
Figure 3:
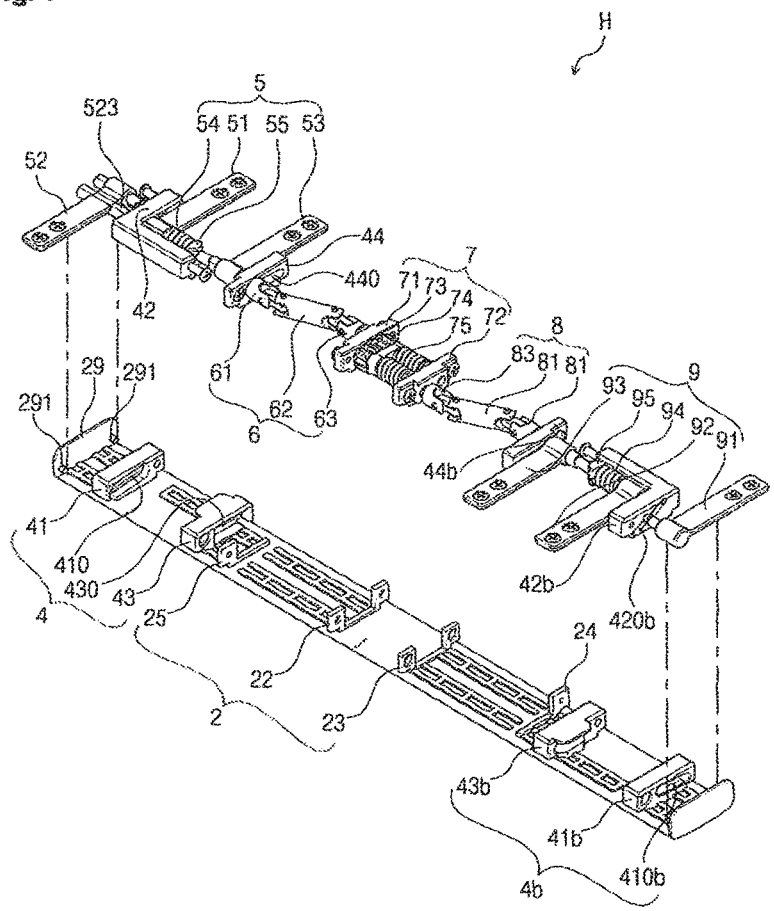
FIG. 3 is an exploded perspective view showing a hinge device of the foldable display device according to the embodiment.
Figure 4:
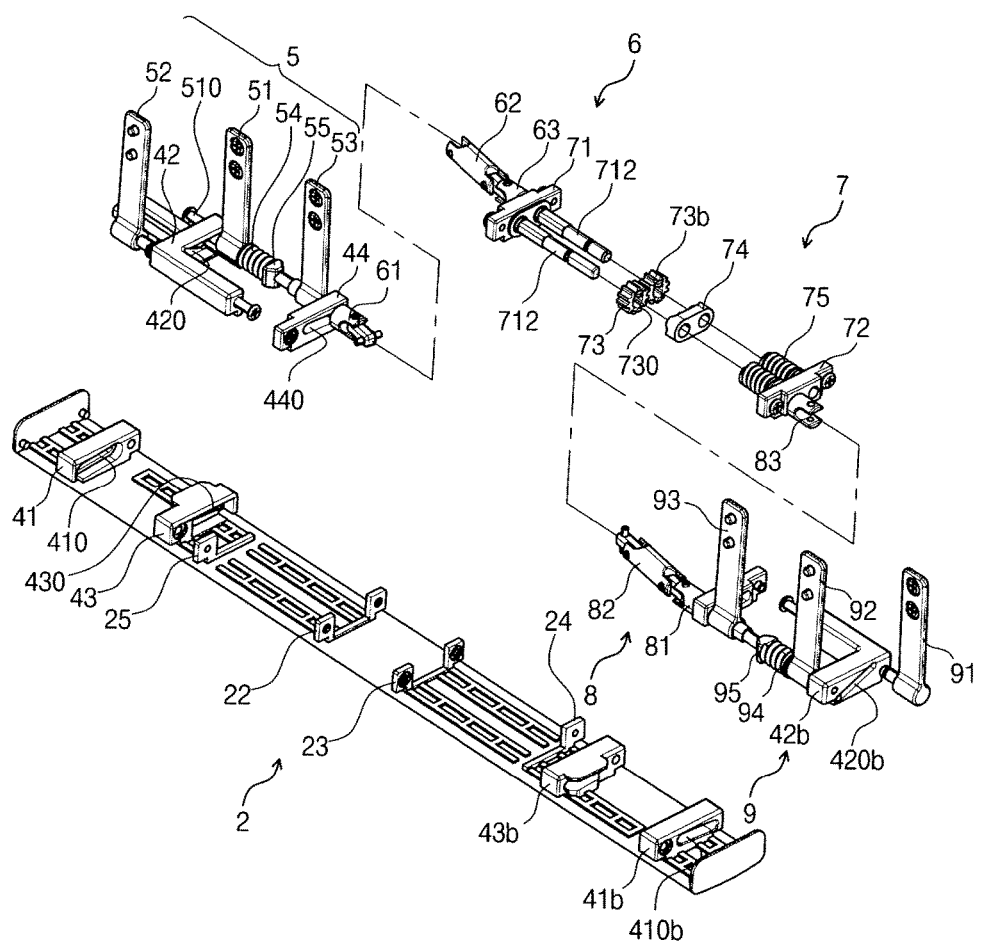
FIG. 4 is an exploded perspective view showing a rotary part, a bending connection part, and an interlocking part of FIG. 3.
Figure 5:
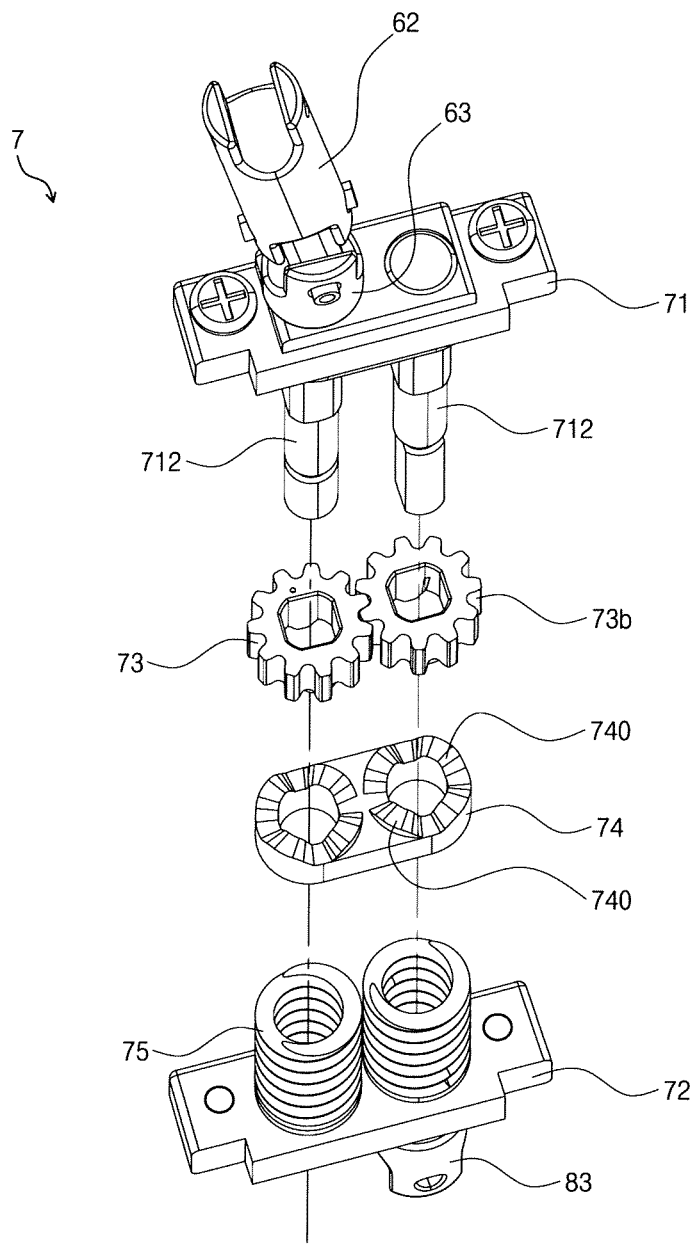
FIG. 5 is an exploded perspective view showing the interlocking part of FIG. 3.
Figure 6:
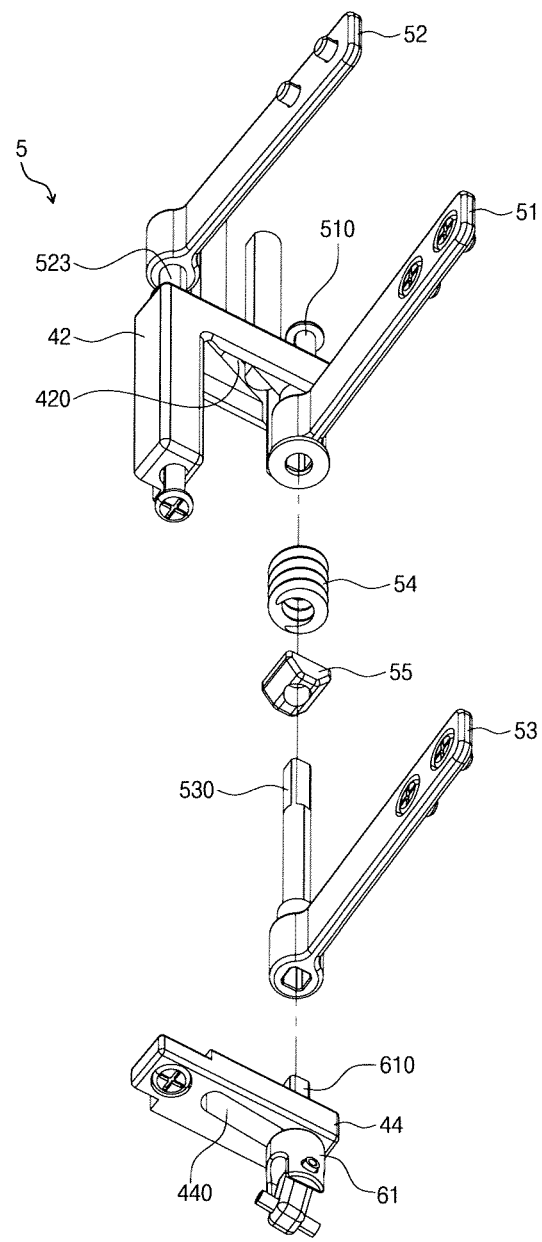
FIG. 6 is an exploded perspective view showing the rotary part of FIG. 3.

As shown in FIGS. 1 to 3, according to an embodiment, the present invention includes a first body 100 and a second body 200 that are formed in the same shape as a plate and are arranged symmetrically with each other; and a hinge device H assembled to connect the first body 100 and the second body 200 to each other, such that the hinge device is rotated within an opened state range where the first and second bodies are placed on the same plane and within a closed state range where the first and second bodies overlap each other.

According to the embodiment, the present invention may be a portable device such as a notebook computer, an electronic dictionary, a PDA, etc. or a general portable terminal such as a mobile phone.

The first body 100 and the second body 200 constitute the body of a foldable display device A, and are configured to rotate with respect to each other.

The first body 100 may be provided with a display part 300 that is made up of a liquid crystal display (LCD), etc. to allow visual images, etc. to be displayed thereon. The second body 200 may be provided with and a keypad, etc. that is used to input information.

Alternatively, the display part 300 may be entirely provided on the first body 100 and the second body 200. In this case, the display part 300 is made of a foldable material.

The first body 100 or the second body 200 may include: a hinge cover 130 rotatably connected to the hinge device H and having a key 132 protruding from opposite sides thereof; an outer cover 110 coupled to the hinge device H and having a sliding groove 112 formed on opposite sides thereof, the sliding groove providing a section where the key 132 of the hinge cover 130 is inserted and moved; and a support plate 120 coupled to the outer cover 110 in an overlapping manner and having the display part 300 attached thereto.

The outer cover 110 has an insertion groove 114 into which a connecting rod 150 provided at the hinge device H is inserted.

Accordingly, the outer cover 110 and the support plate 120 are coupled integrally with each other in an overlapping manner, and the connecting rod 150 is inserted therebetween, so that the outer cover 110 and the support plate 120 are rotated together in cooperation with rotation of the hinge device H.

When the outer cover 110 is rotated in cooperation with rotation of the hinge device H, the key 132 of the hinge cover 130 is moved in the slide groove 112 to accommodate a change in length of the outer cover 110.

The hinge device H includes: a base plate 2 provided to have a length corresponding to a length of the first and second bodies 100 and 200; a first fixing part 4 provided at the base plate 2; a first rotary part 5 coupled to the first fixing part 4; a first bending connection part 6 connected to the first rotary part 5; and an interlocking part 7 providing a rotational force to the first bending connection part 6.

The first fixing part 4 is provided on an upper surface of the base plate 2 and is configured with a first fixing block 41 having a first elongated hole 410 inclined in a first direction, a second fixing block 42 distanced from the first fixing block 41 and having a second elongated hole 420 inclined in a second direction, a third fixing block 43 having a third elongated hole 430 inclined in the same direction as the second elongated hole 420 of the second fixing block 42, and a fourth fixing block 44 having a fourth elongated hole 440 inclined in the same direction as the third elongated hole 430 of the third fixing block 43.

A shaft 523 of a 1st second body connecting piece 52 is fitted into the first elongated hole 410. In an opened state, the shaft of the 1st second body connecting piece 52 is located at an end, that is, at the lowermost portion (right end portion) of the first elongated hole 410 (see FIGS. 11 and 12).

The second elongated hole 420 of the second fixing block 42 is formed to have an inclination angle in a direction opposite to the first elongated hole 410.

A shaft 510 of the 1st first body connecting piece 51 is fitted into the second elongated hole 420. In an opened state, the shaft 510 of the 1st first body connecting piece 51 is located at an end, that is, at the uppermost portion of the second elongated hole 420.

The first rotary part 5 is configured with the 1st second body connecting piece 52 fitted into the first elongated hole 410 of the first fixing block 41 and connected to the second body 200, the 1st first body connecting piece 51 having the shaft 510 fitted into the second elongated hole 420 of the second fixing block 42 and provided in a direction symmetrical to the 1st second body connecting piece 52, the 1st first body connecting piece being connected to the first body 100; a spring 54 elastically supporting the 1st first body connecting piece 51, a pressing member 55 elastically supported by the spring 54 and supported by the third fixing block 43, and a first b-body connecting piece 53 having a shaft 530 inserted into the third elongated hole 430 of the third fixing block 43 to be fitted into the pressing member 55, the spring 54, and the 1st first body connecting piece 51.

The 1st first body connecting piece 51 and the 2nd first body connecting piece 53 are connected to each other by engagement of the shaft 530 to be rotated together simultaneously.

The 1st first body connecting piece 51 and the 2nd first body connecting piece 53 are supported to the second fixing block 42 and the fourth fixing block 44, respectively, by elasticity of the spring 54 fitted over the shaft 530.

The rotation, that is, open or close operation of the 1st first body connecting piece 51 and the 2nd first body connecting piece 53 cooperates with the first bending connection part 6.

The first bending connection part 6 is configured with a first link 61 fitted into the fourth elongated hole 440 of the fourth fixing block 44 and having a shaft 610 fitted into the 2nd first body connecting piece 53, a third link 63 coupled to a first bracket 71 provided at the base plate 2 while passing therethrough, and a second link 62 hinged at a first side thereof to the first link 61 and hinged at a second side thereof to the third link 63.

The second link 62 changes in angle in a left or right direction with respect to the third link 63.

In an opened state, the second link 62 is inclined to the left direction, and in a closed state, the second link 62 is inclined to the right direction.

A left and right change in angle of the second link 62 is performed in cooperation with movement of the first link 61 moved in the fourth elongated hole 440.

The first bending connection part 6 is rotated in cooperation with the interlocking part 7.

The interlocking part 7 is configured with the first bracket 71 provided at the base plate 2 and into which a shaft 712 of the third link 63 is fitted, a first cam 73 fitted over the shaft 712 to be rotated in cooperation with rotation of the third link 63, the first cam having gear teeth formed on the outer periphery thereof and concave portions and convex portions formed on a front surface thereof, a second cam 74 having concave portions and convex portions formed on a front surface thereof to be coupled to the first cam 73, a main spring 75 compressed to support the second cam 74, and a second bracket 72 provided at the base plate 2 and supporting the main spring 75.

A 2nd first cam 73b is provided to be engaged with the gear teeth of the first cam 73, and the 2nd first cam 73b has concave portions and convex portions 740 formed thereon.

The convex portions 730 of the first cam 73 and the 2nd first cam 73b are formed oppositely to be symmetrical with each other at intervals of 180°, and the concave portions therebetween are formed oppositely to be symmetrical with each other.

Correspondingly, the second cam 74 has a total of four concave portions and convex portions 740 formed at intervals of 90°.

Accordingly, when the first cam 73 is rotated, the 2nd first cam 73b is rotated. Herein, the first cam and the 2nd first cam are rotated together in opposite directions.

When the first cam 73 and the 2nd first cam 73b are rotated together, the second cam 74 is pushed and this action is performed at intervals of about 90°.

The convex portions 730 of the first cam 73 and the 2nd first cam 73b are brought into contact with the convex portions 740 of the second cam 74 to push the second cam 74. The convex portions 730 of the first cam 73 and the 2nd first cam 73b are inserted into the concave portions of the second cam 74, and then the second cam 74 returns to an original position thereof by elasticity of the main spring 75 exerted thereto.

Meanwhile, a second bending connection part 8 is rotated in cooperation with rotation of the 2nd first cam 73b.

The second bending connection part 8 is configured with a 2nd third link 83 having a shaft fitted into the second bracket 72 of the base plate 2 while passing through a side thereof, a 2nd second link 82 hinged at an end thereof to the 2nd third link 83, and a 2nd first link 81 connected to the 2nd second link 82.

The hinge device includes a second fixing part 4b connected to the second bending connection part 8 and provided at a second side of the base plate 2, and a second rotary part 9 connected to the second fixing part 4b and connected to the first body 100 and the second body 200.

The second fixing part 4b is configured with a 2nd first fixing block 41b provided on the upper surface of the base plate 2 and having a first elongated hole 410 inclined in a first direction, a 2nd second fixing block 42b distanced from the 2nd first fixing block 41b and having a second elongated hole 420 inclined in a second direction, a 2nd third fixing block 43b having a third elongated hole 430 inclined in the same direction as the second elongated hole 420 of the 2nd second fixing block 42b, and a 2nd fourth fixing block 44b having a fourth elongated hole 440 inclined in the same direction as the third elongated hole 430 of the 2nd third fixing block 43b.

The second rotary part 9 is configured with a 3rd first body connecting piece 91 fitted into the first elongated hole 410 of the 2nd first fixing block 41 and connected to the second body 200, a 2nd second body connecting piece 92 having a shaft fitted into the second elongated hole 420b of the 2nd second fixing block 42b and provided in a direction symmetrical to the 3rd first body connecting piece 91, the 2nd second body connecting piece being connected to the second body 200, a spring 54 elastically supporting the 2nd second body connecting piece 92, a pressing member 55 elastically supported by the spring 54 and supported by the 2nd third fixing block 43b, and a 3rd second body connecting piece 93 having a shaft 530 inserted into the third elongated hole 430 of the 2nd third fixing block 43b to be fitted into the pressing member 55, the spring 54, and the 2nd second body connecting piece 92.

The operation of the embodiment will be described below.

Figure 7:
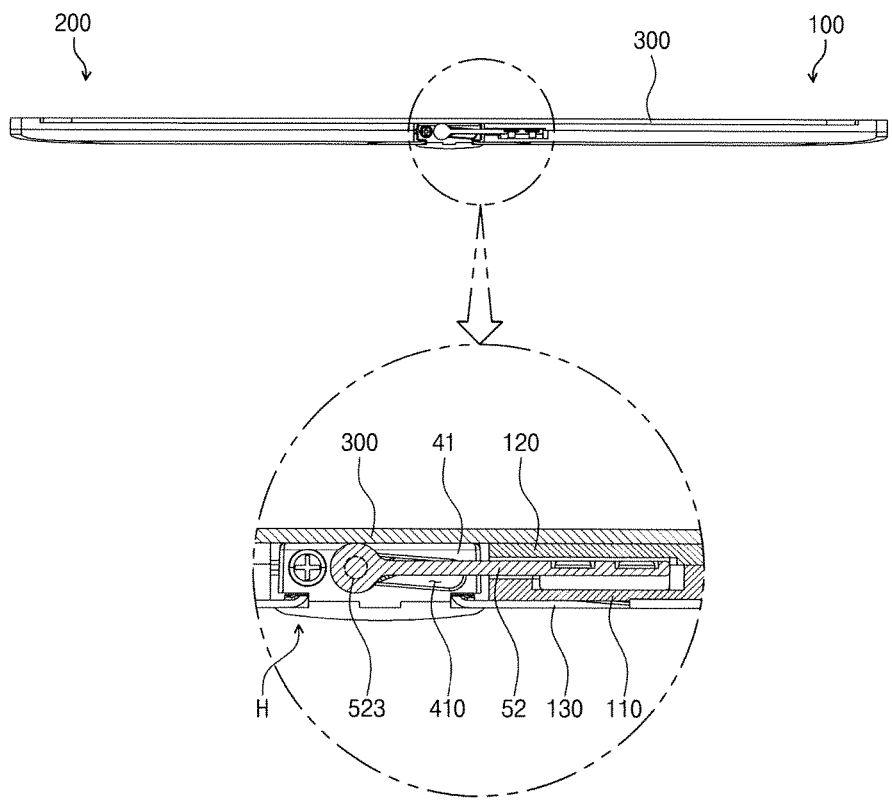
FIG. 7 is a front sectional view showing the hinge device in a 180-degree opened state according to the embodiment of the present invention.
Figure 8:
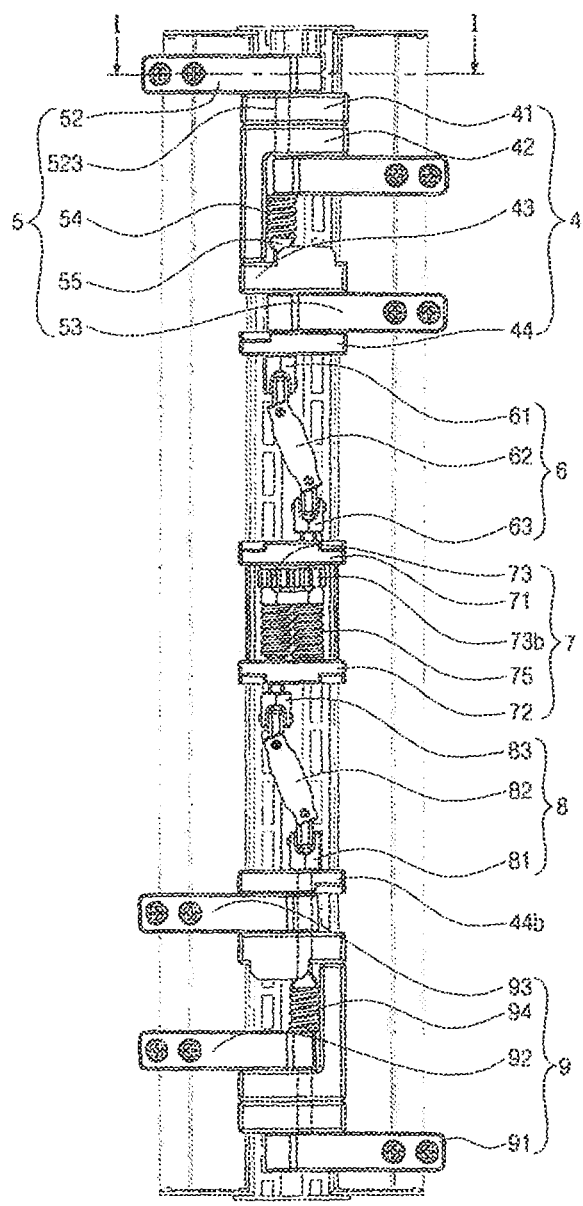
FIG. 8 is a plan view of FIG. 7.
Figure 9:
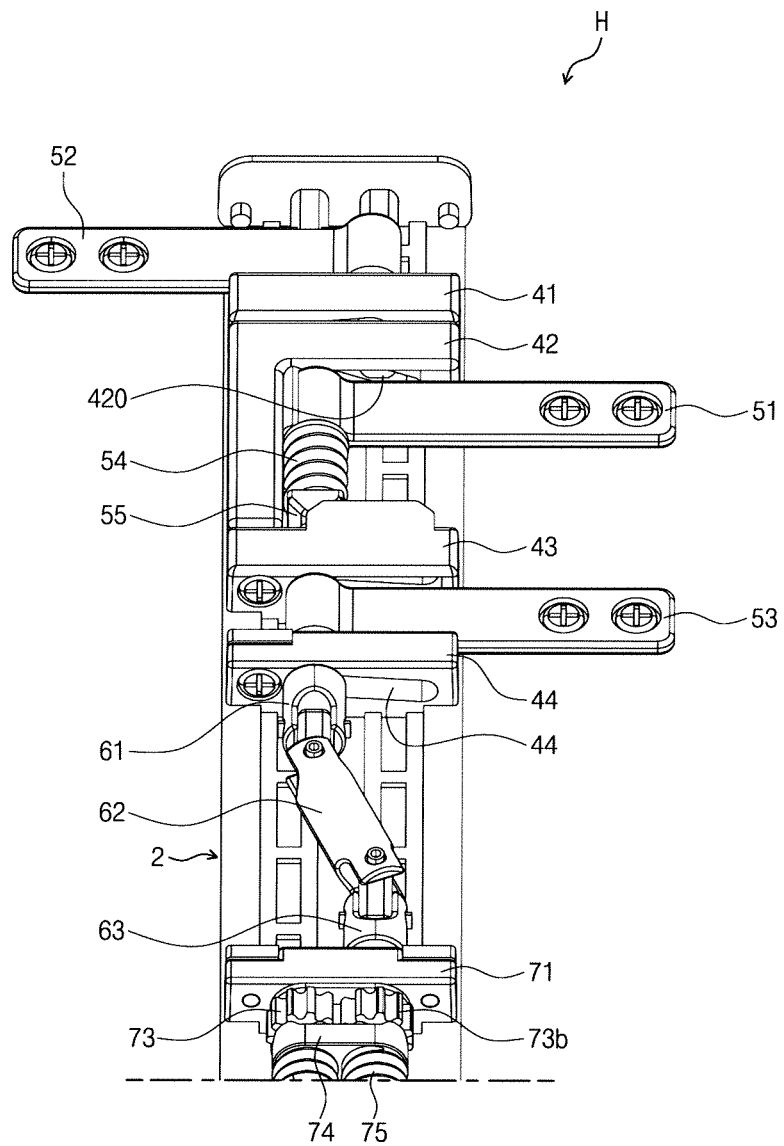
FIG. 9 is a partially enlarged perspective view of FIG. 8.

As shown in FIGS. 7 to 9, when the first and second bodies 100 and 200 are opened in opposite directions (opened state), the 1st first body connecting piece 51 and the 2nd first body connecting piece 53, and the 1st second body connecting piece 52 and the 3rd first body connecting piece 91 are arranged 180° in the opposite directions.

The second link 62 of the first bending connection part 6 is bent inclinedly to the left in the drawings, and the first link 61 is moved to the upper left of the third elongated hole 430 and the fourth elongated hole 440.

The first cam 73 connected to the third link 63 is rotated, and the 2nd first cam 73b meshed with the first cam 73 is rotated therewith in a direction opposite thereto.

The second bending connection part 8 is rotated in cooperation with rotation of the 2nd first cam 73b.

The 2nd third link 83 of the second bending connection part 8 is rotated, the 2nd second link 82 connected thereto is rotated therewith and inclined to the right in the drawings, and the 2nd first link 81 is rotated therewith.

The second rotary part 9 connected to the 2nd first link 81 is operated.

The 3rd first body connecting piece 91 of the second rotary part 9 is rotated horizontally in cooperation with rotation of the first body 100.

The 2nd second body connecting piece 92 and the 3rd second body connecting piece 93 are rotated horizontally in cooperation with rotation of the second body 200.

Meanwhile, a rotation angle of the first body 100 and the second body 200 may be set variously to 450, 1350, 2250, 3150, etc.

In other words, such a rotation angle may be set by an angle of engagement between the convex portions of the first cam 73 and the 2nd first cam 73b and the concave portions of the second cam 74 arranged at intervals of 45°.

Furthermore, the first and second bodies may be maintained in a temporary stop state at the set angle due to an elastic supporting force of the main spring 75.

Figure 10:
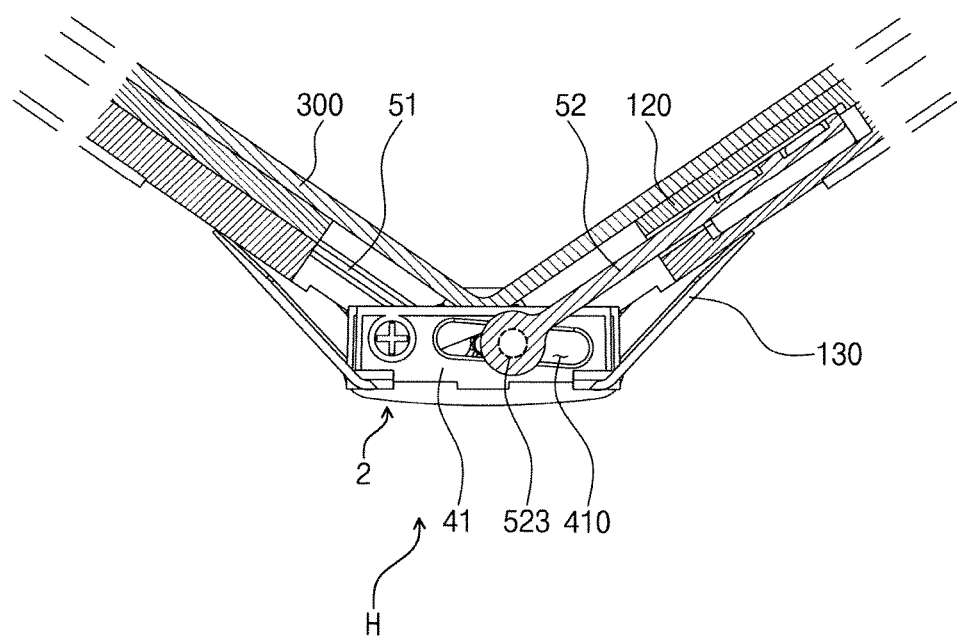
FIG. 10 is a front sectional view showing the hinge device in a 45-degree opened state according to the embodiment.
Figure 11:
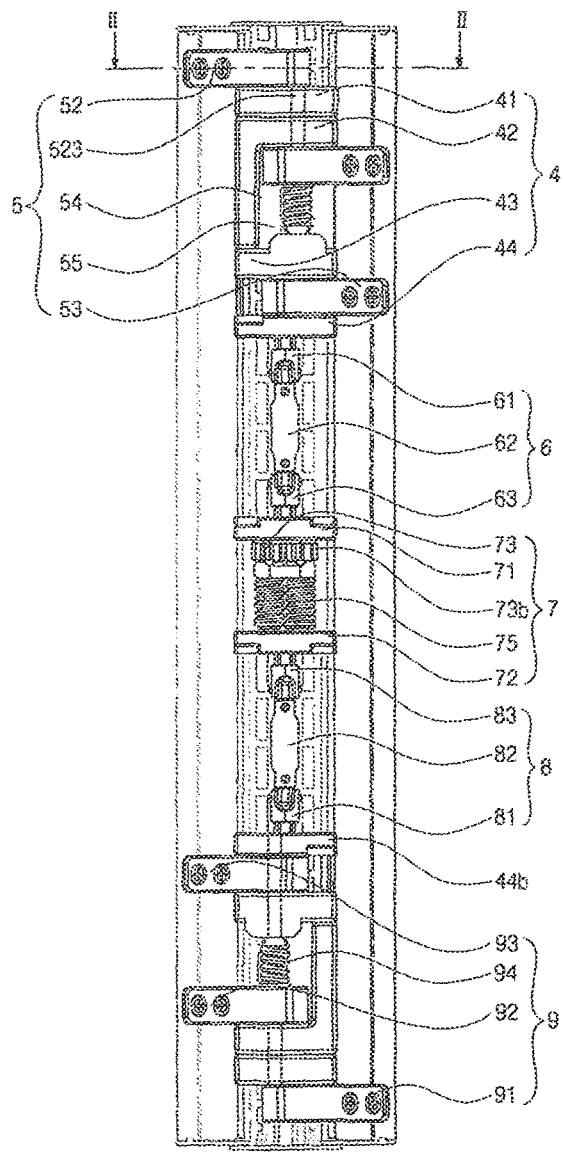
FIG. 11 is a plan view of FIG. 10.
Figure 12:
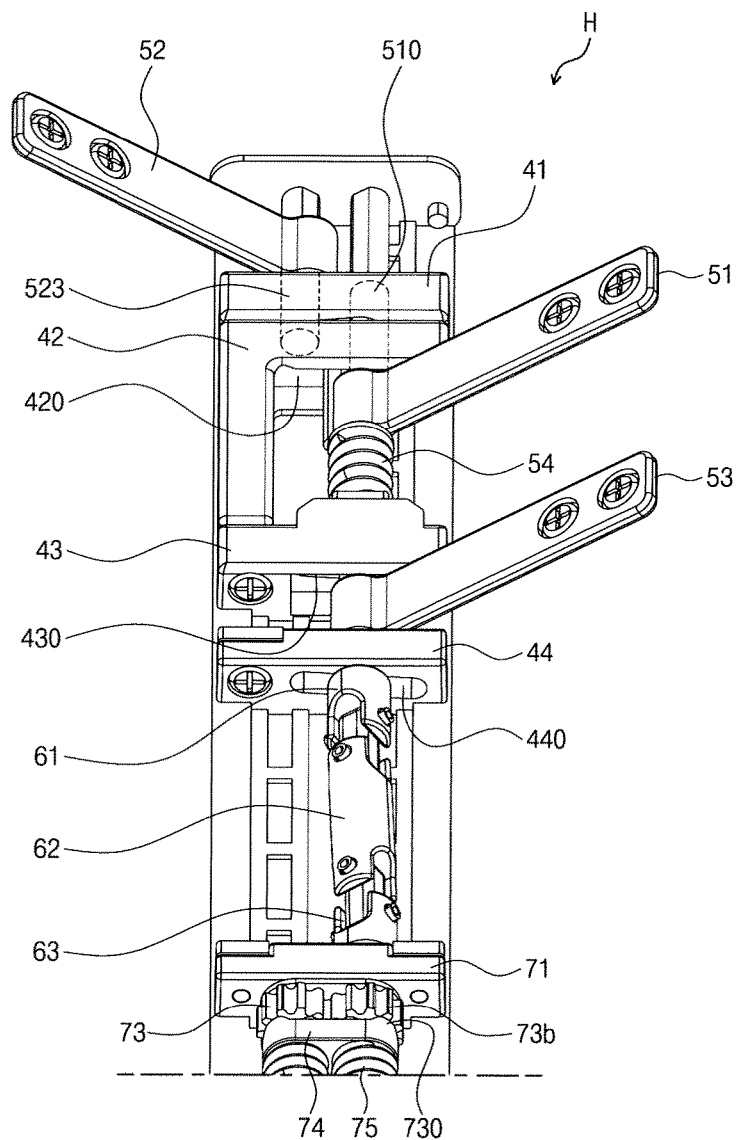
FIG. 12 is a partially enlarged perspective view of FIG. 10.

For example, as shown in FIGS. 10 to 12, when the first body 100 and the second body 200 are closed 45°, the 1st, 2nd, 3rd first body connecting pieces 51, 53, and 91, and the 1st, 2nd, 3rd second body connecting pieces 52, 92, and 93 of the first rotary part 5 and the second rotary part 9 described above are rotated 45°.

The second link 62 of the first bending connection part 6 is located linearly in the drawings, and the first link 61 is located at the centers of the third elongated hole 430 and the fourth elongated hole 440.

The first cam 73 connected to the third link 63 is rotated, and the 2nd first cam 73b meshed with the first cam 73 is rotated therewith in an amount substantially equal to half of rotation of the first cam.

The second bending connection part 8 is rotated in cooperation with rotation of the 2nd first cam 73b and thus is located linearly like the first bending connection part 6.

In other words, the 2nd third link 83, the 2nd second link 82, and the 2nd first link 81 of the second bending connection part 8 are rotated together and thus located linearly in the drawings.

The second rotary part 9 connected to the 2nd first link 81 is operated.

The 3rd first body connecting piece 91 of the second rotary part 9 is rotated 45° in cooperation with rotation of the first body 100.

The 2nd second body connecting piece 92 and the 3rd second body connecting piece 93 are rotated 45° in cooperation with rotation of the second body 200.

Figure 13:
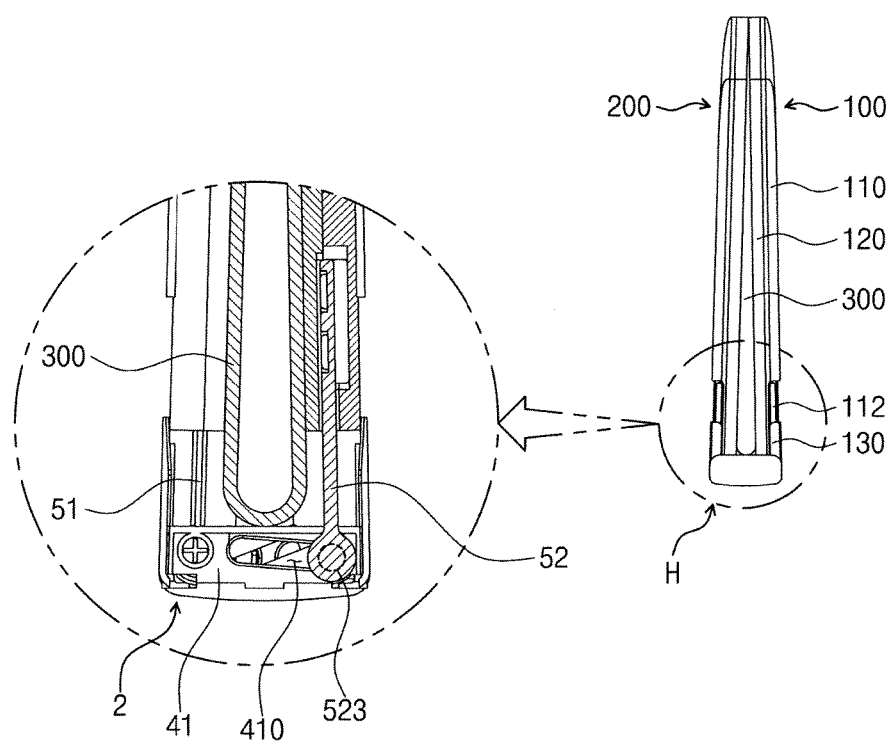
FIG. 13 is a front sectional view showing the foldable display device in a closed state according to the embodiment.
Figure 14:
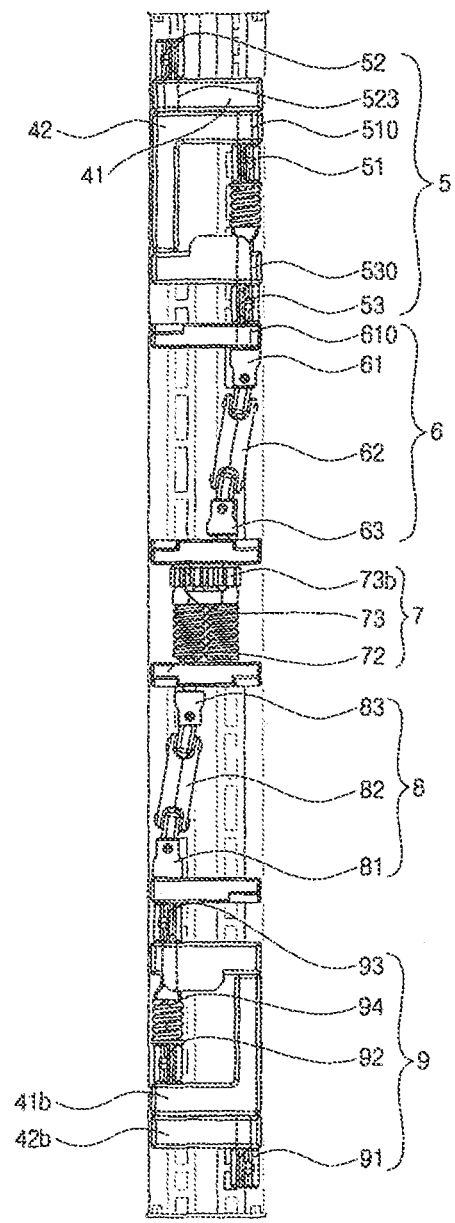
FIG. 14 is a plan view of FIG. 13.

Meanwhile, as shown in FIGS. 13 to 15, when the first body 100 and the second body 200 are closed, the 1st, 2nd, 3rd first body connecting pieces 51, 53, and 91, and the 1st, 2nd, 3rd second body connecting pieces 52, 92, and 93 of the first rotary part 5 and the second rotary part 9 described above are rotated 90°.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A foldable display device, comprising:
a first body and a second body that are formed in the same shape as a plate and are arranged symmetrically with each other; and
a hinge device assembled to connect the first body and the second body to each other, such that the hinge device rotates within an open state range where the first and second bodies are placed on the same plane and within a close state range where the first and second bodies overlap each other,
wherein the first body or the second body includes:
a hinge cover rotatably connected to the hinge device and having a key protruding from opposite sides thereof;
an outer cover coupled to the hinge device and having a sliding groove formed portions corresponding to a position of the key of the hinge cover thereof, the sliding groove providing a section where the key of the hinge cover is inserted and moved; and
a support plate coupled to the outer cover in an overlapping manner and having an image portion attached thereto, wherein the hinge device includes:
a base plate provided to have a length corresponding to a length of the first and second bodies;
a first fixing part provided on an upper surface of the base plate and configured with a first fixing block having a first elongated hole inclined in a first direction, a second fixing block distanced from the first fixing block and having a second elongated hole inclined in a second direction, a third fixing block having a third elongated hole inclined in the same direction as the second elongated hole of the second fixing block, and a fourth fixing block having a fourth elongated hole inclined in the same direction as the third elongated hole of the third fixing block;
a first rotary part configured with a 1st second body connecting piece fitted into the first elongated hole of the first fixing block and connected to the second body, a 1st first body connecting piece having a shaft fitted into the second elongated hole of the second fixing block and provided in a direction symmetrical to the 1st second body connecting piece, the 1st first body connecting piece being connected to the first body, a spring elastically supporting the 1st first body connecting piece, a pressing member elastically supported by the spring and supported by the third fixing block, and a 2nd first body connecting piece having a shaft inserted into the third elongated hole of the third fixing block to be fitted into the pressing member, the spring, and the 1st first body connecting piece;
a first bending connection part configured with a first link fitted into the fourth elongated hole of the fourth fixing block and having a shaft fitted into the 2nd first body connecting piece, a third link coupled to a first bracket provided at the base plate while passing therethrough, and a second link hinged at a first side thereof to the first link and hinged at a second side thereof to the third link; and
an interlocking part configured with the first bracket provided at the base plate and into which a shaft of the third link is fitted, a first cam fitted over the shaft to be rotated in cooperation with rotation of the third link, the first cam having teeth formed on an outer periphery thereof and concave portions and convex portions formed on a front surface thereof, a second cam having concave portions and convex portions formed on a front surface thereof to be coupled to the first cam, a main spring compressed to support the second cam, and a second bracket provided at the base plate and supporting the main spring.

2. The foldable display device of claim 1, wherein a 2nd first cam is provided to be engaged with the gear teeth of the first cam, and the 2nd first cam has concave portions and convex portions formed thereon, the convex portions of the first cam or the 2nd first cam are formed oppositely to be symmetrical with each other at intervals of 180°, and the concave portions therebetween are formed oppositely to be symmetrical with each other, and the second cam has a total of four concave portions and convex portions formed at intervals of 90°.

3. The foldable display device of claim 1, further comprising:

a second bending connection part configured with a 2nd third link having a shaft fitted into the second bracket of the base plate while passing through a side thereof, a 2nd second link hinged at an end thereof to the 2nd third link, and a 2nd first link connected to the 2nd second link.

4. The foldable display device of claim 3, further comprising:

a second fixing part connected to the second bending connection part, and configured with a 2nd first fixing block provided on the upper surface of the base plate and having a first elongated hole inclined in a first direction, a 2nd second fixing block distanced from the 2nd first fixing block and having a second elongated hole inclined in a second direction, a 2nd third fixing block having a third elongated hole inclined in the same direction as the second elongated hole of the 2nd second fixing block, and a 2nd fourth fixing block having a fourth elongated hole inclined in the same direction as the third elongated hole of the 2nd third fixing block; and a second rotary part configured with a 3rd first body connecting piece fitted into the first elongated hole of the 2nd first fixing block and connected to the second body, a 2nd second body connecting piece having a shaft fitted into the second elongated hole of the 2nd second fixing block and provided in a direction symmetrical to the 3rd first body connecting piece, the 2nd second body connecting piece being connected to the second body, a spring elastically supporting the 2nd second body connecting piece, a pressing member elastically supported by the spring and supported by the 2nd third fixing block, and a 3rd second body connecting piece having a shaft inserted into the third elongated hole of the 2nd third fixing block to be fitted into the pressing member, the spring, and the 2nd second body connecting piece.

* * * * *